US008570218B2

(12) United States Patent
Aibara

(10) Patent No.: US 8,570,218 B2
(45) Date of Patent: Oct. 29, 2013

(54) SATELLITE RADIOWAVE RECEIVER AND SATELLITE RADIOWAVE RECEIVING METHOD

(75) Inventor: Takehiro Aibara, Hamura (JP)

(73) Assignee: Casio Computer Co., Ltd, Tokyo (JP)

( * ) Notice: Subject to any disclaimer, the term of this patent is extended or adjusted under 35 U.S.C. 154(b) by 78 days.

(21) Appl. No.: 13/239,883

(22) Filed: Sep. 22, 2011

(65) Prior Publication Data

US 2012/0075143 A1   Mar. 29, 2012

(30) Foreign Application Priority Data

Sep. 29, 2010  (JP) .................................. 2010-219006

(51) Int. Cl.
 *G01S 19/29* (2010.01)
(52) U.S. Cl.
 CPC .................................... *G01S 19/29* (2013.01)
 USPC .................................................. 342/357.68
(58) Field of Classification Search
 CPC .................................. G01S 19/29; G01S 19/24
 USPC ......................................... 342/357.68, 357.63
 See application file for complete search history.

(56) References Cited

U.S. PATENT DOCUMENTS

| 4,701,934 | A | * | 10/1987 | Jasper ........................... 375/147 |
| 5,177,490 | A | * | 1/1993 | Ando et al. ............... 342/357.68 |
| 5,323,164 | A | * | 6/1994 | Endo ......................... 342/357.65 |
| 6,114,992 | A | * | 9/2000 | Underbrink .............. 342/357.67 |
| 6,195,328 | B1 | * | 2/2001 | Tsui et al. ...................... 370/210 |
| 6,522,871 | B1 | * | 2/2003 | Patrick et al. .................. 455/256 |
| 7,362,795 | B1 | * | 4/2008 | Lennen ......................... 375/149 |
| 7,715,279 | B2 | | 5/2010 | Urano et al. |
| 2005/0063487 | A1 | * | 3/2005 | Sayegh .......................... 375/316 |

FOREIGN PATENT DOCUMENTS

| JP | 2008-032637 | 2/2008 |
| JP | 2008-051529 | 3/2008 |

* cited by examiner

*Primary Examiner* — Gregory C Issing
(74) *Attorney, Agent, or Firm* — Turocy & Watson, LLP

(57) ABSTRACT

Disclosed is a satellite radiowave receiver which obtains a satellite signal transmitted from a positioning satellite including a receiving unit which receives a radiowave in a frequency range which is set in advance, the frequency range including a frequency transmitted by the positioning satellite transmit, a capture unit which detects the satellite signal from a received signal based on the radiowave received by the receiving unit and a calculation unit which calculates a mean frequency of a plurality of the satellite signals which are detected, based on receiving frequencies of the plurality of the satellite signal detected by the capture unit, and the capture unit detects the satellite signal according to the mean frequency.

7 Claims, 10 Drawing Sheets

SATELLITE RADIOWAVE RECEIVER AND SATELLITE RADIOWAVE RECEIVING METHOD

CROSS-REFERENCE TO RELATED APPLICATIONS

This application is based upon and claims the benefit of priority from the prior Japanese Patent Application No. 2010-219006, filed Sep. 29, 2010, the entire contents of which are incorporated herein by reference.

BACKGROUND OF THE INVENTION

1. Field of the Invention

The present invention relates to a satellite radiowave receiver which receives radiowave from positioning satellites to obtain satellite signals and a satellite radiowave receiving method thereof.

2. Description of Related Art

Conventionally, portable devices such as clocks/watches and GPS loggers which obtain time information and position information by receiving radiowaves from positioning satellites according to GNSS (Global Navigation Satellite System) such as GPS (Global Positioning System) are known. Due to their power restriction, low power consumption components are used and power saving operation is carried out in such portable devices.

For example, JP 2008-32637 discloses a technique to cut off the receiving operation during a period other than the timing when time information is transmitted among satellite signals when obtaining time information from positioning satellites. Further, JP 2008-51529 discloses a time correction device which is provided with an advanced sensor to obtain position information by receiving data from four satellites and determine the time zone only when it is determined that moving by an airplane took place.

Transmission frequencies of radiowaves which are transmitted from positioning satellites are the same among a plurality of positioning satellites. For example, one of the civilian radiowave frequency transmitted from positioning satellites of GPS (GPS satellites) is L1-band of 1.57542 GHz. However, because the doppler effect occurs due to relative movement between the GPS satellites and the portable device because each of the GPS satellites moves in its orbit at high speed, and the receiving frequency at the portable device be a frequency deviated from each of the transmission frequencies. Therefore, when receiving radiowave from positioning satellites by a porable device which does not have its own current position data and orbit information of the positioning satellites in advance, receiving frequencies for receiving radiowaves from the positioning satellites need to be searched within a range which may change due to the doppler effect.

On the other hand, with regard to an oscillation circuit which demodulates satellite signals from the received radiowaves and generates frequency signals for carrying out digital sampling in the portable device, each of the oscillation frequencies thereof includes error. Further, this error in each oscillation frequency is even greater in a small low power consumption oscillation circuit which can be mounted in the portable device. Therefore, when searching for radiowave transmitted from positioning satellites, the search needs to be carried out in a broad range of receiving frequencies including the range of errors in the oscillation frequencies. Thus, the searching time be lengthy and the amount of power consumption increases.

SUMMARY OF THE INVENTION

It is, therefore, a main object of the present invention is to provide a satellite radiowave receiver which does not cause increase in power consumption and which can shorten the searching time of satellite radiowaves, and a satellite radiowave receiving method thereof.

According to one aspect of the present invention, there is provided a satellite radiowave receiver which obtains a satellite signal transmitted from a positioning satellite including a receiving unit which receives a radiowave in a frequency range which is set in advance, the frequency range including a frequency transmitted by the positioning satellite transmit, a capture unit which detects the satellite signal from a received signal based on the radiowave received by the receiving unit and a calculation unit which calculates a mean frequency of a plurality of the satellite signals which are detected, based on receiving frequencies of the plurality of the satellite signal detected by the capture unit, and the capture unit detects the satellite signal according to the mean frequency.

According to a second aspect of the present invention, there is provided a satellite radiowave receiving method to obtain a satellite signal from a radiowave received by a receiving unit by comprising the receiving unit which receives the radiowave transmitted form a positioning satellite including capturing by detecting the satellite signal from a received signal based on the radiowave received by the receiving unit and calculating a mean frequency of a plurality of the satellite signals which are detected, based on the receiving frequencies of the plurality of satellite signals which are detected in the capturing, and in the capturing, the satellite signal is detected according to the mean frequency.

BRIEF DESCRIPTION OF THE DRAWINGS

The above and other objects, advantages and features of the present invention will become more fully understood from the detailed description given hereinbelow and the appended drawings which are given by way of illustration only, and thus are not intended as a definition of the limits of the present invention, and wherein.

DESCRIPTION OF THE PREFERRED EMBODIMENT

Hereinafter, the satellite radiowave receiver according to the embodiment of the present invention will be described based on the drawings.

Figure 1:
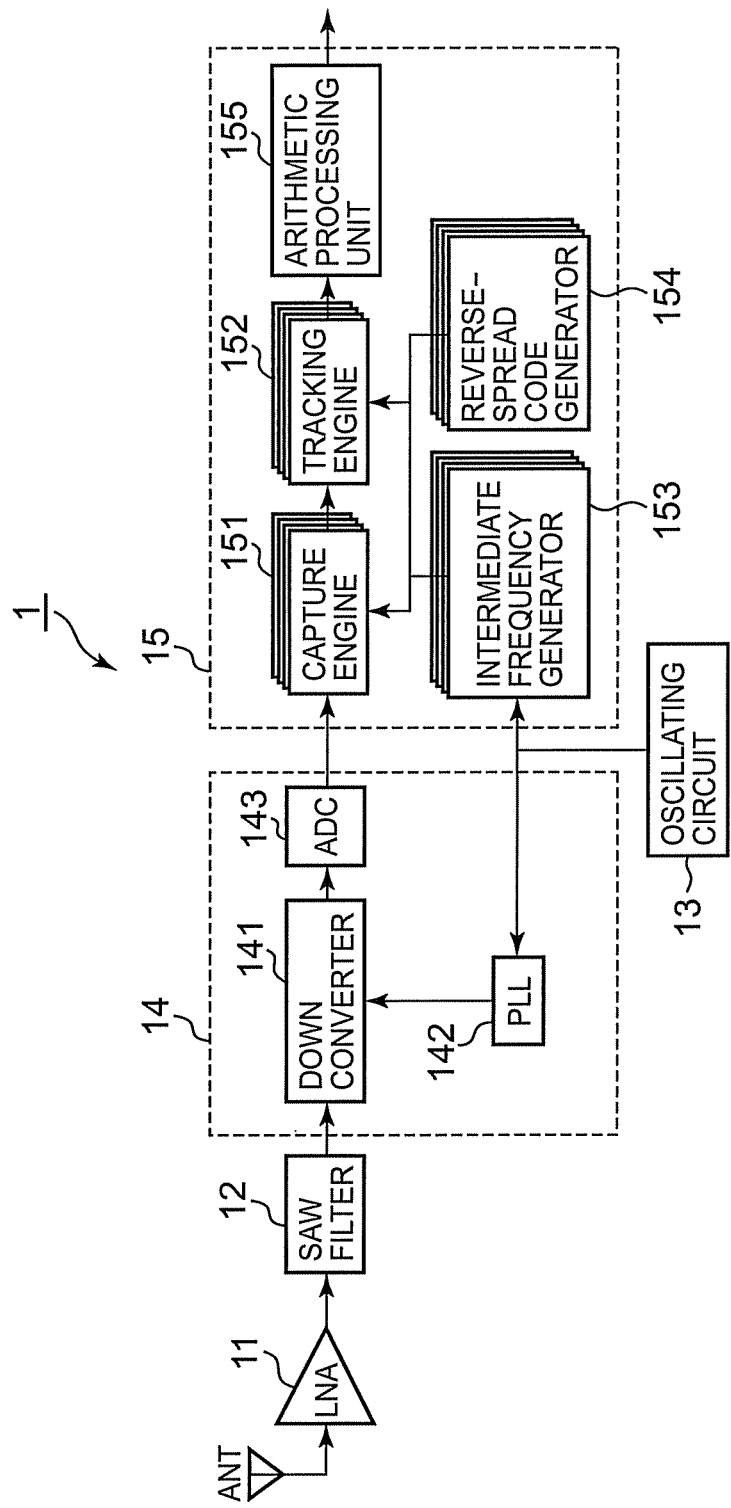
FIG. 1 is a block diagram showing a structure of satellite radiowave receiver according to an embodiment of the present invention.

FIG. 1 is a block diagram showing a structure and a signal flow of the satellite radiowave receiver according to an embodiment.

The satellite radiowave receiver 1 is installed in a portable watch/clock and outputs time information. The satellite radiowave receiver 1 includes a receiving antenna ANT, a low-noise amplifier (LNA) 11, a narrow-band filter 12, an oscillating circuit 13, a RF unit 14, a base band unit 15 and the like.

The receiving antenna ANT is an antenna which can receive radiowave of L1-band (1.57542 GHz) from a GPS satellite. Further, the narrow-band filter 12 is a SAW filter (surface acoustic wave filter), for example, having a band of about 1 to 10 MHz. This bandwidth is sufficiently broad comparing to the amount of frequency deviation due to the doppler effect between transmission frequency from a GPS satellite and receiving frequency of the satellite radiowave receiver 1 and is sufficiently broader than frequency error included in a local frequency signal in intermediate frequency band which is inputted when satellite signal is to be demodulated. The receiving unit is constituted of the receiving antenna ANT, the low-noise amplifier 11, the narrow-band filter 12 and the RF unit 14.

Crystal oscillator (TCXO) which is provided with a temperature compensation circuit is generally used for the oscillating circuit 13, for example. However, a low power consumption crystal oscillator which does not compensate for temperature may also be used in the present invention. The oscillating circuit 13 generates and outputs signals of 16.368 MHz, for example, as a reference frequency. The oscillating circuit 13 is an inexpensive low power consumption device in small size, and is not a large device which provides high accuracy and/or an expensive device. Therefore, offset error of about ±10 to 15 kHz innate to the oscillating circuit 13 is included in the reference frequency which the oscillating circuit 13 oscillates.

The RF unit 14 converts received signals of carrier frequency based on received radiowave into signals of intermediate frequency band and outputs the data after converting the signals into digital data. The RF unit 14 includes a down converter 141, a PLL (Phase Locked Loop) 142, an ADC (analog/digital converter) 143 and the like.

The down converter 141 is a circuit to convert the received signal of carrier frequency based on the received radiowave into a signal in the intermediate frequency, and for example, the down converter 141 includes a mixer and a narrow-band filter. Intermediate frequency fi has a value of about 4 MHz, for example.

The PLL 142 is a circuit to input signals of a predetermined local frequency in the mixer of the down converter 141 by making the signals of a predetermined local frequency be synchronized with the output signals of the oscillating circuit 13, and for example, the PLL 142 includes a VCO (Voltage Controlled Oscillator), a prescaler, a phase comparator and the like. The VCO generates signals of frequency set by the inputted direct current voltage and outputs the signals to the mixer of the down converter 141. The prescaler divides the frequency of the signals outputted from the VCO and outputs them to the phase comparator. The phase comparator compares the phase of the divided signal of the VCO to the phase of the signal outputted from the oscillating circuit, and outputs the direct current voltage based on the obtained phase difference to the VCO. By controlling the local frequency by the above structure, the PLL 142 is able to output a given frequency signal stably to the down converter 141.

The ADC 143 converts the received signal which is outputted from the down converter 141 by being converted into a signal of intermediate frequency band into a digital value at a predetermined sampling frequency and outputs the digital value to the base band unit 15.

The base band unit 15 includes a capture engine 151 (capture unit), a tracking engine 152, an intermediate frequency generator 153, a reverse-spread code generator 154 and an arithmetic processing unit 155. Further, the base band 15 includes a controller 156 (calculation unit 156a) which controls the operation of the base band unit 15 and which includes a CPU (Central Processing Unit), and a memory 157 (storage unit) such as a RAM (Random Access Memory) which temporarily stores data (see FIG. 2)

The capture engine 151 is a circuit to carry out a processing to identify receiving frequency and satellite identification number by detecting a satellite signal from the digital signal which is inputted from the RF unit 14. The detail will be described later.

The tracking engine 152 is a circuit which detects a phase synchronization point between the satellite signal having the receiving frequency and the satellite identification number defined by the capture engine 151 and the internal clock of the satellite radiowave receiver 1 and maintains the phase synchronization to continuously output decoded satellite signals.

The intermediate frequency generator 153 generates an intermediate frequency local signal which is to be inputted to the capture engine 151 or the tracking engine 152 when a satellite signal is to be demodulated from the digital signal which is inputted from the RF unit 14. In the base band unit 15 of the embodiment, NCO (Numerically-Controlled Oscillator) is adapted for the intermediate frequency generator 153. By the numerical value to be inputted to the NCO, frequency of the intermediate frequency local signal to be generated can be finely changed. Further, the intermediate frequency generator 153 can output I-phase (In Phase) local signal and Q-phase (Quadrature Phase) local signal orthogonal to the I-phase local signal.

The reverse-spread code generator 154 generates spread code in which the satellite signal is spread-modulated in the GPS satellite corresponding to the specified satellite identification number and outputs the generated spread code to the capture engine 151 or the tracking engine 152. In the reverse-spread code generator 154 in the satellite radiowave receiver 1 of the embodiment, C/A code is generated as spread code. C/A code is constituted of an arrangement of 1023 pieces of coded data (chips) which are transmitted during one cycle of 1 ms.

The arithmetic processing unit 155 obtains time data by decoding the satellite signal which is outputted from the tracking engine 152. Further, the arithmetic processing unit 155 calculates the position of the GPS satellite and calculates the current position of the satellite radiowave receiver 1 as needed, and outputs the obtained data and the calculated data in a predetermined format.

Next, the detection process of satellite signal performed in the capture engine 151 will be described.

Figure 2:
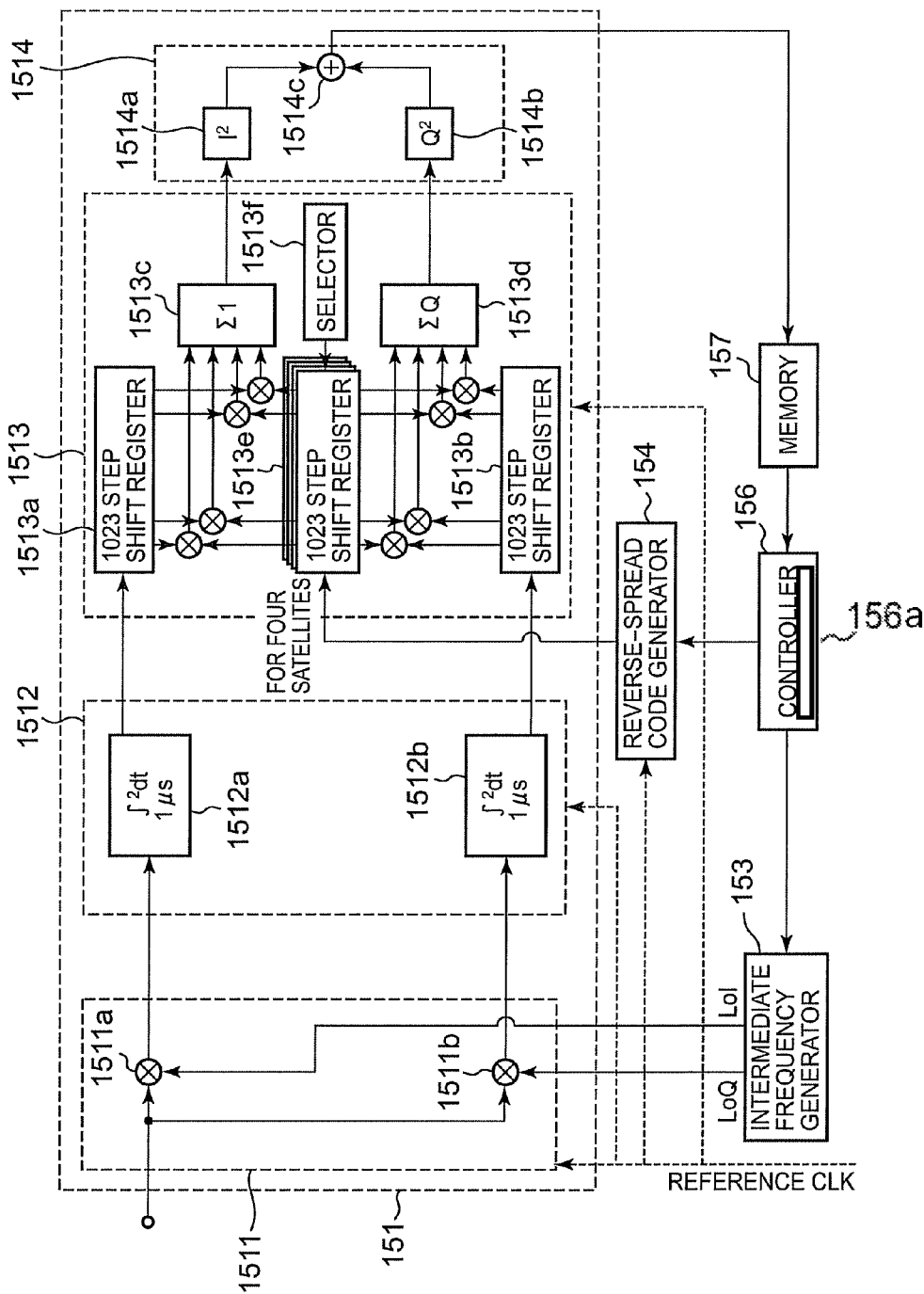
FIG. 2 is a diagram showing an inside structure of capture engine.

FIG. 2 is a diagram showing the capture engine 151 and the structure of parts relating to the capture engine 151.

The capture engine 151 includes an I/Q converter 1511, an integration unit 1512, a correlator 1513 and a square circuit 1514.

The I/Q converter 1511 separates the input signal into I-phase signal and Q-phase signal orthogonal to the I-phase signal to output. The I/Q converter 1511 includes mixers 1511a and 1511b. To the digital signal of intermediate frequency band which is inputted in the I/Q converter 1511 from the RF unit 14 and which is separated into two systems, the I-phase local signal and the Q-phase local signal outputted from the intermediate frequency generator 153 are respectively mixed in the mixers 1511a and 1511b. When the frequency of the I-phase local signal and the frequency of the Q-phase local signal are same as the intermediate frequencies of the inputted digital signals, respectively, and when the phases of the digital signals and the phase of the internal clock synchronize with each other completely, the output signals outputted from the mixers 1511a and 1511b be I-phase local signal and Q-phase local signal, respectively.

The integration unit 1512 includes integrators 1512a and 1512b which respectively integrates and outputs the output signals of the mixers 1511a and 1511b for the length of one chip of C/A code, that is, for the length of 1/1023 ms (upto 1 μs). Alternatively, the integrators 1512a and 1512b may be low pass filters which cut alternate current component which is short comparing to the length of one chip of C/A code.

The correlator 1513 is a matched filter which obtains output data of the integrators 1512a and 1512b for each integration cycle to obtain correlation between the obtained output signals and the generated C/A code. The output data of the integrator 1512a is inputted to the shift register 1513a and the output data of the integrator 1512b is inputted to the shift register 1513b. In each of the shift registers 1513a and 1513b, 1023 pieces data are tandemly accumulated in order of input.

In the shift register 1513e, same number of pieces of data as in the shift registers 1513a and 1513b, that is, 1023 chips of data corresponding to one cycle of the C/A code are inputted in order from the reverse-spread code generator 154. The shift register 1513e can store C/A codes for four satellites simultaneously and parallely, and one C/A code of any of the GPS satellites is to be selected by the selector 1513f. Each piece of the chip data which represent the C/A code of the GPS satellite which is selected by the selector 1513 is multiplied by a piece of data stored in the shift register 1513a of same phase (inputted in the same nth in the order) and multiplied by a piece of data stored in the shift register 1513b of same phase (inputted in the same nth in the order), and the obtained data are respectively inputted to the adders 1513c and 1513d. Each of the adders 1513c and 1513d adds the 1023 values which are inputted from the multiplier and outputs the obtained value to the square circuit 1514.

The square circuit 1514 includes square calculation units 1514a and 1514b which respectively raise the added value of I-phase signal and the added value of Q-square signal which are inputted from the correlator 1513 to the second power and an adder 1514c which calculates the sum of the calculation results of the square calculation units 1514a and 1514b. The calculation result of the adder 1514c is outputted to the memory 157 of the base band unit 15 and stored in the aftermentioned predetermined position. Here, the square circuit 1514 may output the square root of the output of the adder 1514c.

Figure 3:
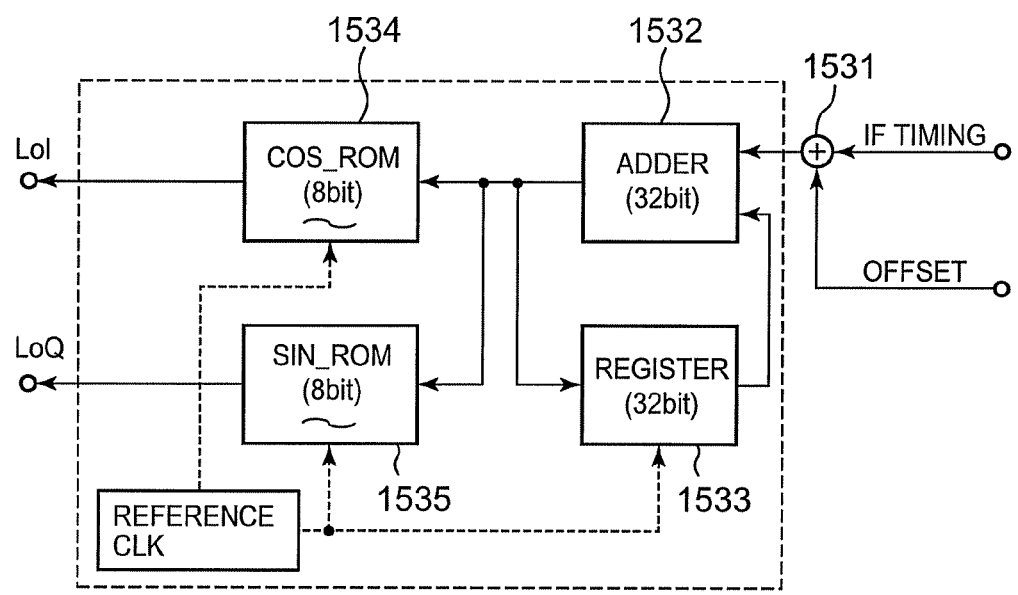
FIG. 3 is a diagram showing an inside structure of intermediate frequency generator.

FIG. 3 is a block diagram showing the structure of the intermediate frequency generator 153 of the base band unit 15.

The intermediate frequency generator 153 is NCO, and includes adders 1531 and 1532, a register 1533, a COS ROM 1543, a SIN_ROM 1535 and the like.

The set IF timing value and offset value are inputted to the adder 1531, and these values are added in the adder 1531 and the sum value thereof is transmitted to the adder 1532. In the adder 1532, the value inputted from the adder 1531 and the value inputted from the register 1533 are added and the sum value thereof is transmitted to the COS ROM 1534 and the SIN ROM 1535, and in addition, the sum value is also stores in the register 1533. That is, the value which is to be stored in the register 1533 increases by the value inputted in the adder 1532 from the adder 1531 at predetermined time intervals. Then, by the value stored in the register 1533 reaching the maximum value and further returning to 0, elapsing of one cycle is indicated. The adder 1532 and the register 1533 are not specifically limited. However, for example, the adder 1532 and the register 1533 each has data capacity of 32 bit.

The COS_ROM 1534 is a ROM provided with a look-up table in which one cycle of cosine function where its amplitude is 1 is equally divided into 256 phases expressed by 8 bits, for example, and which reads out the value of cosine function of each phase from the address corresponding to each phase and outputs the read value. The SIN_ROM 1535 is a ROM provided with a look-up table in which one cycle of sine function where its amplitude is 1 is equally divided into 256 phases expressed by 8 bits, for example, and which reads out the value of sine function of each phase from the address corresponding to each phase and outputs the read value. When a numerical value of 32 bits is inputted to each of the COS_ROM 1534 and the SIN_ROM 1535 from the adder 1532, values of cosine function and sine function are respectively read from the addresses corresponding to the phases indicated by the values of upper 8 bits among the 32 bits, for example. Then, by the values being sequentially read out at predetermined time intervals, the values become I-phase local signal LoI and Q-phase local signal LoQ of the specific frequency.

Here, the set input value of IF timing is the standard intermediate frequency, that is a value corresponding to intermediate frequency $fi=4.092$ MHz in the satellite radiowave receiver 1 of the embodiment. Therefore, when the offset value (receiving channel f) of the intermediate frequency is 0, local frequency signal of intermediate frequency $fi=4.092$ MHz is outputted. On the other hand, by changing the offset value from 0, the local frequency to be output can be increased or decreased digitally from 4.092 MHz. In the satellite radiowave receiver 1 in the embodiment, amount of change in frequency $\Delta f$ corresponding to the change 1 of receiving channel f is set to 100 Hz. Therefore, the local frequency to be output increases by 100 Hz from the intermediate frequency fi every time the received channel f increases by 1, and the local frequency to be output decreases by 100 Hz from the intermediate frequency fi every time the receiving channel f decreases by 1.

Figures 4A, 4B:
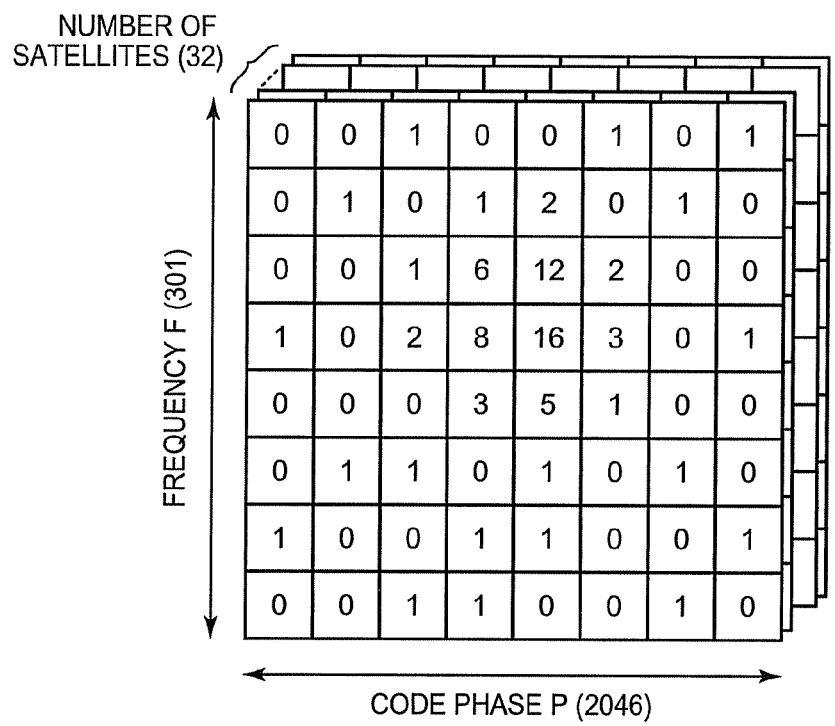
FIGS. 4A and 4B are diagrams showing memory arrangement.

FIGS. 4A and 4B are diagrams showing arrangement patterns of stored data in the memory 157 of the base band unit 15.

First, data to be stored in the memory 157 is disposed in a three dimensional arrangement where the arrangement is made according to three parameters of phase of C/A code, receiving frequency (receiving channel) and satellite identification number as shown in FIG. 4A. The output data of correlation value obtained by setting the three parameters in the capture engine 151 are stored in positions set by the three parameters.

When the value s of S/N ratio calculated by the aftermentioned method based on the values stored in the three dimensional arrangement shown in FIG. 4A is greater than the set threshold value a, it is determined that a satellite signal is detected. When a satellite signal is detected, the receiving channel f and the S/N value s are stored in order from address n=0 as shown in FIG. 4B. The number of address is 30 that is from 0 to 29, for example, and after data being stored in address n=29, address n in which address is to be stored next returns to 0 again. Then, data to be stored is to overwrite the old data which has been stored in n=0. That is, the part of the memory 157 where receiving channels f and S/N values s are stored is a ring buffer. The address n to be stored next can be stored in the memory 157 and can be read out from there. Further, at the initial stage, 0 is stored as default for each of receiving channels f and S/N values s of the addresses n=0 to 29.

Next, the principle of the satellite radiowave capturing method carried out in the capture engine 151 of the satellite radiowave receiver 1 in the embodiment will be described.

Figure 5:
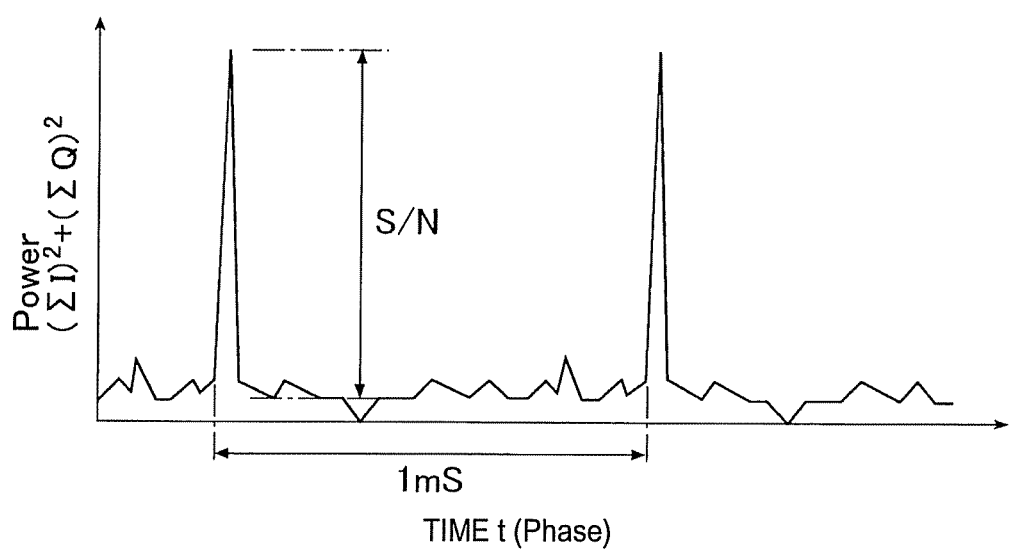
FIG. 5 is a diagram showing signal intensity at the time of satellite signal detection by the capture engine.

FIG. 5 is a diagram showing an example of output data from the capture engine 151 when a C/A code of one GPS satellite is generated and radiowave is received from the one GPS at one receiving frequency in the capture engine 151.

Among the phase differences between the 1023 pieces of data stored in each of the shift registers 1513a and 1513b and the 1023 pieces of chip data indicating the C/A code transmitted to the shift register 1513e from the reverse-spread code generator 154, there is a timing when the phase difference be smaller than 1 chip in every cycle of the C/A code. At this timing, the correlation value of C/A code and input data increases, and output value increases drastically. On the other hand, with regard to C/A code, autocorrelation between data arrangements of different phases is very low. Therefore, when the phase difference is 1 chip or more, the output value is always very small. In view of the above, in the base band unit 15 of the embodiment, ratio between the maximum value in one cycle among the values outputted from the square circuit 1514 and the average value of the values excluding the maximum value is obtained as S/N value. Here, as for S/N value, logarithm of the above calculated value may also be used, for example.

In the base band unit 15, the above described obtaining operation of S/N value is performed to C/A code of each GPS satellite and each receiving frequency. The receiving frequency is changed with respect to the transmission frequency from the GPS satellite within the range of influence of doppler velocity caused by the moving speed of GPS satellite and offset error included in the oscillation frequency of the oscillating circuit 13. The change in frequency Δf from intermediate frequency fi due to the doppler effect is several kHz at the maximum under normal condition. Therefore, in order to specify the receiving frequency at an accuracy of about 100 Hz while considering the offset error of about ±15 kHz included in the oscillation frequency of the oscillating circuit 13, searching operation by the capture engine 151 needs to be repeated by switching the change in frequency Δf for about 300 times. Further, even when offset error is obtained in advance and only the correction of the obtained offset error is carried out, the searching operation by the capture engine 151 taking the doppler effect in to consideration still needs to be repeated for about 50 times.

Figure 6:
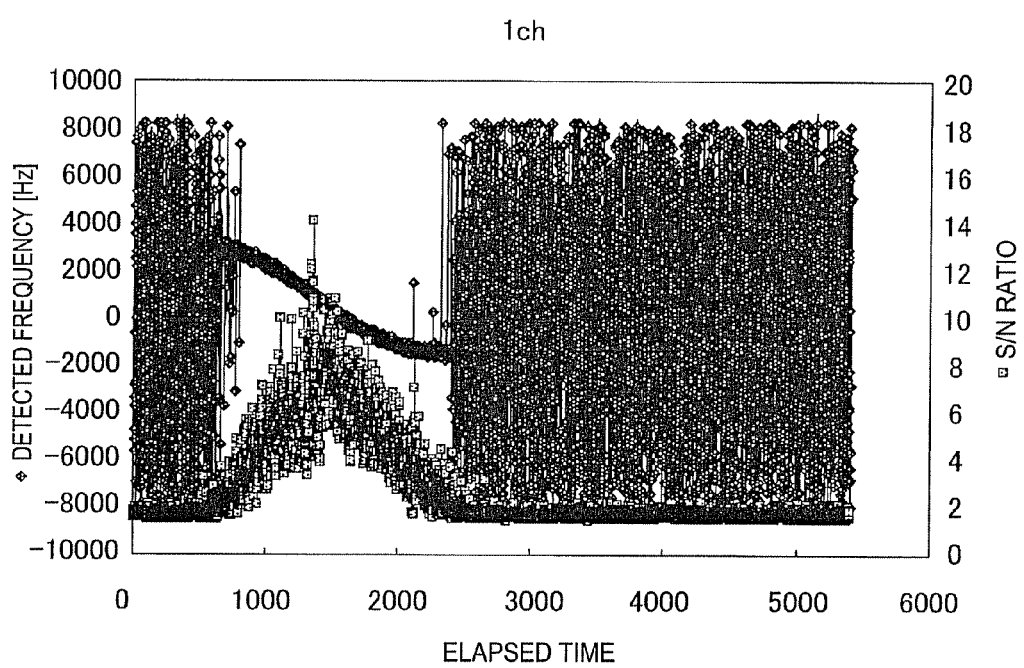
FIG. 6 is a diagram for explaining relation between detected frequencies and detected signal intensity with respect to satellite position.

FIG. 6 is a diagram showing the simulation result of an example of changes of receiving frequency and S/N ratio value when capturing operation by the capture engine 151 is continuously carried out to one GPS satellite.

Each GPS satellite revolves around the earth in a cycle of 11 hours 58 minutes. Therefore, each GPS satellite returns to the same position with respect to the ground on earth in a cycle of 23 hours 56 minutes. During the period when the GPS satellite is below the horizon and cannot be seen from the satellite radiowave receiver 1, there is no signal input. Therefore, during this period, the S/N ratio value be 1 to 2 as shown in the right side vertical axis in FIG. 6 and by the changes of the points indicated by squares. Further, during this period, a settled change in frequency Δf cannot be obtained as shown in the left side vertical axis in FIG. 6 and by the changes in the points indicated by diamonds.

On the other hand, when the GPS satellite is above the horizon and can be seen from the satellite radiowave receiver 1, radiowave from the GPS satellite is received and S/N ratio value increases. The change in frequency Δf due to the doppler effect at this time changes based on the position and orbit of the GPS satellite during the observation period. That is, in the example shown in FIG. 6, when the position of the GPS satellite moves toward the zenith from near the horizon and the elevation angle increases, the change in frequency Δf be a positive value due to the relative velocity in the direction the GPS satellite approaches the observation point. In contrary, when the position of the GPS satellite moves toward the horizon from near the zenith and the elevation angle decreases, the change in frequency Δf be a negative value due to the relative velocity in the direction the GPS satellite moves away from the observation point.

Further, the receiving intensity of the radiowave received from the GPS satellite will be stronger as the GPS satellite approaches the zenith, and therefore, the S/N value increases. This is because as the position of the GPS satellite approaches the zenith, the distance between the GPS satellite and the observation point on the ground will be shorter, and also because the distance in which signals pass through the ionized layer and the atmosphere, which causes radiowave to attenuate, will be shorter. In such way, the more the change in frequency Δf be close to 0 and the position of the GPS satellite be near the zenith, the more the S/N ratio value improves.

Here, change in pattern of the change in frequency Δf and the S/N value differs according to the latitude of the observation point and the positional relation between the observation point and each of the GSP satellite orbits. That is, depending on latitude and longitude of the observation point and date, changes in S/N values do not be distributed symmetrically with respect to the position where the S/N value be the best value, for example, as shown in FIG. 6. On the other hand, when the radiowave from the GPS satellite is to be received at the same position at the same time, deviation of 4 minutes per day accumulates gradially due to the difference between one day period of the earth and the revolution period of the GPS satellite while showing approximately similar receiving characteristics.

In view of the above, in the satellite radiowave receiver 1 of the embodiment, receiving channel f and S/N value s are stored in the memory 157 when S/N value s measured for each satellite identification number and each frequency set by the capture engine 151 exceed a predetermined threshold value a. Then, mean frequency channel fc is calculated by taking the average of the values of receiving channels f of a plurality of GPS satellites stored in the memory 157 while taking the sizes of the S/N values s into consideration. At the time of next receiving process, by carrying out the searching process by the capture engine 151 setting the mean frequency channel fc as the center, radiowave having good S/N value can be detected from the GPS satellite promptly while suppressing the influences of doppler effect and offset error of the oscillating circuit 13.

The mean frequency channel fc is calculated by the following formula (1) using weighted average by the S/N values of the received channels f.

$$fc = \Sigma_k (f_k s_k) / \Sigma_k (f_k) \quad (1)$$

Here, subscript "k" of the receiving channel $f_k$ and in the S/N value $s_k$ indicate each of the values of address k=n=0 to 29 in the memory 157. Further, $\Sigma_k$ indicates the sum of addresses k=0 to 29. Alternatively, as for the intermediate frequency channel fc, average value of the receiving channels f, which are weighted so as to be the newer the data stored in the memory 157, the heavier the weighting, may be used. Here, when satellite signal is not yet detected for 30 times, sum of only the detected data can be obtained for the above purpose.

Next, the operation procedure of the satellite radiowave searching process using the capture engine 151 will be described by using flow charts.

Figure 7:
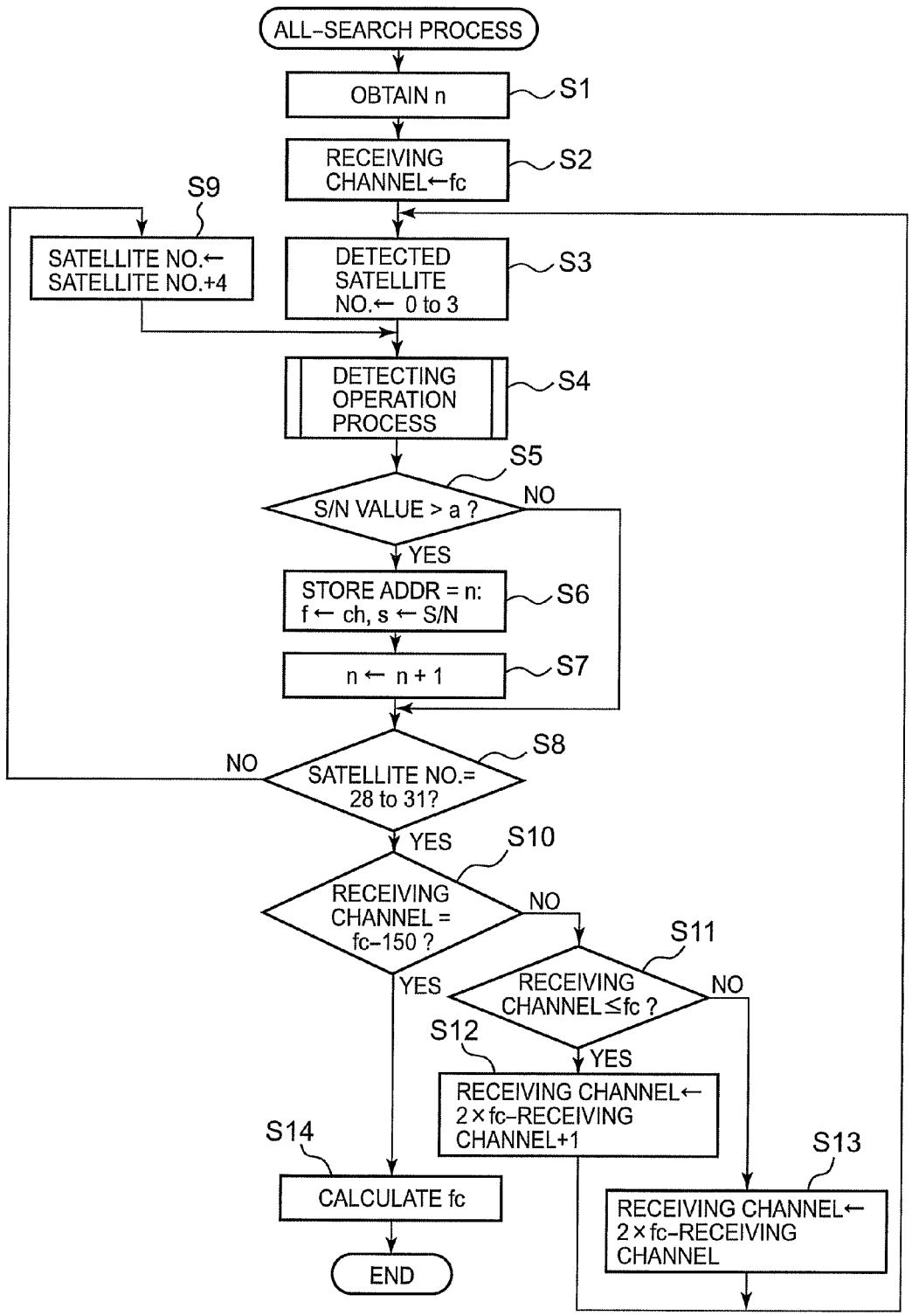
FIG. 7 is a flowchart showing all-search procedure of satellite signals.
Figure 8:
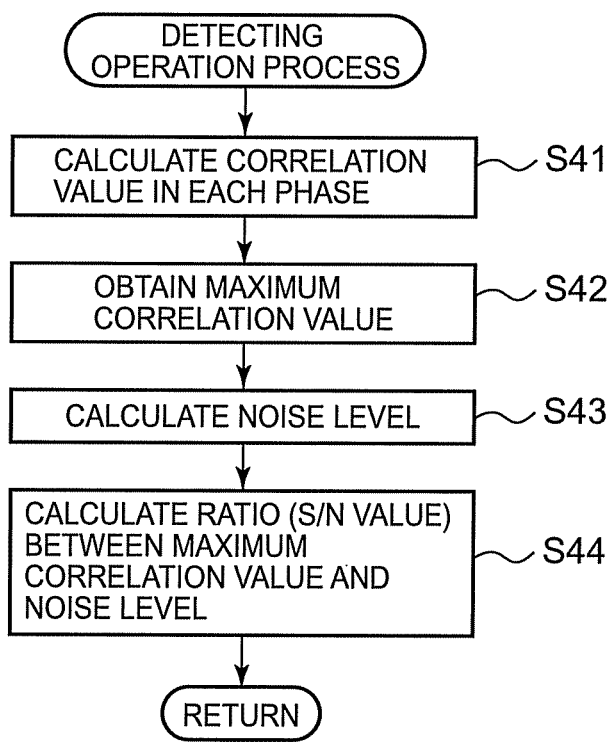
FIG. 8 is a flowchart showing a procedure of searching operation process.

FIG. 7 is a flowchart showing the control procedure carried out by the controller 156 in the all-search process in which GPS satellite radiowave is searched within all of the GPS satellites and all of the set frequency ranges. Further, FIG. 8 is a flowchart showing the control procedure in the detecting operation process which is invoked in FIG. 7.

The all-search process is, for example, activated when the power of the satellite radiowave receiver 1 is turned on for the first time.

When the all-search process is started, first, the controller 156 obtains the newest write address n from the memory 157 (step S1). Further, the controller 156 sets a mean frequency channel fc as the initial receiving channel which indicates the value to be substituted as the offset value in the intermediate frequency generator 153 (step S2). Here, 0 is set as the initial value of mean frequency channel fc. In addition, the controller 156 sets 0 to 3 as the identification numbers of the GPS satellites which correspond to the C/A codes to be stored in the shift register 1513e first (step S3)

When setting of parameters in steps S1 to S3 is completed, the controller 156 evokes the detecting operation process and carries out detecting operation of signals transmitted from GPS satellites (step S4). In particular, as shown in FIG. 8, the controller 156 first operates the reverse-spread codes generator 154 to input C/A codes of the set satellite identification numbers in the shift register 1513e. Then, the controller 156 supplies operation clock signal to the entire capture engine 151 and stores I-phase signal and Q-phase signal which are calculated by the I/Q converter 1511 and the integration unit 1512 in the shift registers 1513a and 1513b in order, respectively. When data is stored in all of the registers in the shift registers 1513a and 1513b, the controller 156 operates the selector 1513f to output C/A codes of four satellites in order from the shift register 1513e before next data is to be inputted to the shift registers 1513a and 1513b. Then, the controller 156 obtains output values, which are calculated based on each of the C/A code data and input signals, of the adder 1514c in order and stores the output Values in the memory 157 (step S41).

The controller 156 outputs the C/A codes of four satellites from the shift register 1513e by operating the selector 1513f every time when a piece of data is inputted to each of the shift registers 1513a and 1513b and phase thereof changes for one piece of data. Then, the controller 156 makes the capture engine 151 perform calculation based on the C/A codes and input signals of four satellites and stores each piece of data in the address of the phase in the memory 157 in order. When data of all phases with respect to the set four satellites and the receiving channels f, the controller 156 selects the maximum output value among the output values of all phases of the set receiving channels f for each of the set four GPS satellites (step S42). Thereafter, the controller 156 calculates the average value of the output values excluding the selected maximum output value for each GPS satellites (step S43), and calculates the ratio of the maximum output value to the calculated average value (noise level) as the S/N ratio value (step S44). When the S/N values are calculated, the controller 156 ends the searching operation process and returns to the all-search process.

When the detecting operation process (step S4) is ended, next, the controller 156 determines whether each of the calculated S/N value is greater than the set threshold value a or not (step S5). When it is determined that all of the calculated S/N values are equal to the set threshold value a or smaller, the processing of the controller 156 proceeds to step S8. When it is determined that any of the calculated S/N values is greater than the set threshold value a, the controller 156 stores the receiving channel f and the calculated S/N value s in the position of address n in the memory 157 for each value which is determined as being greater than the threshold a (step S6). Further, the controller 156 adds 1 to the address n (step S7). Then, the processing of the controller 156 proceeds to step S8.

When the processing of the controller 156 proceeds to step S8, the controller 156 determines whether the set satellite identification numbers are 28 to 31 or not. When it is determined that the set satellite identification numbers are not 28 to 31, the controller 156 adds 4 to each of the four set satellite identification numbers (step S9). Then, the controller 156 repeats the processing of steps S4 to S8.

When it is determined that the set satellite identification numbers are 28 to 31 in the determining process of step S8, thereafter, the controller 156 determines whether the set receiving channel is the mean frequency channel fc−150 or not (step S10).

When it is determined that the set receiving channel is not the mean frequency channel fc−150 in the determining process of step S10, next, the controller 156 determines whether the set receiving channel is the mean frequency channel fc or smaller or not (step S11). When it is determined that the set receiving channel is the mean frequency channel fc or smaller, the controller 156 sets the next receiving channel to be the channel obtained by "2fc—present receiving channel+1" (step S12). Then, the controller 156 repeats the processing of steps S3 to S11. On the other hand, when it is determined that the set receiving channel is greater than the mean frequency channel fc, the controller 156 sets the next receiving channel to be the channel obtained by "2fc—present receiving channel" (step S13). Thereafter, the controller 156 repeats the processing of steps S3 to S10. That is, in the processing of steps S10 to S13, the receiving channel is set so as to gradually be distanced from the mean frequency channel fc in order such as "fc"→"fc+1"→"fc−1"→"fc+2"→"fc−2"→ . . . "fc+150"→"fc−150".

When it is determined that the set receiving channel is the mean frequency channel fc−150 in the determining process of step S10, the processing of the controller 156 proceeds to step S14. Then, the controller 156 calculates the mean frequency channel fc for next time and stores the calculated mean frequency channel fc of next time in the memory 157, and ends the all-search process.

Figure 9:
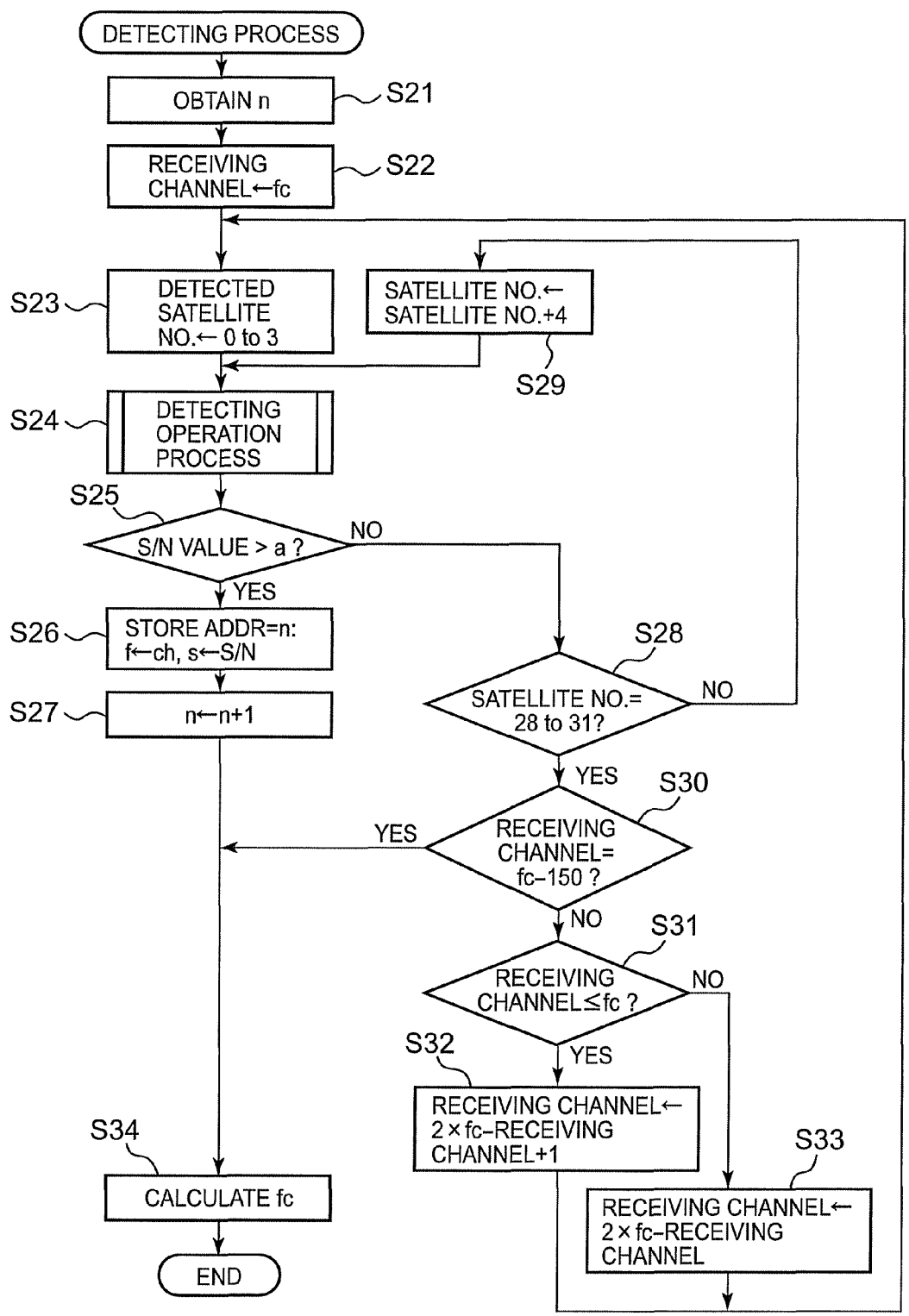
FIG. 9 is a flowchart showing a procedure of searching process of satellite signals.

FIG. 9 is a flowchart showing the control procedure carried out by the controller 156 in the detecting process of searching any one of the radiowaves from the GPS satellites.

The detecting process is a process which is carried out after the all-search process is done, and for example, the searching process is automatically evoked and started once a day at a predetermined time.

When the detecting process is started, first, the controller 156 obtains the newest write address n from the memory 157 (step S21). Further, the controller 156 sets the mean frequency channel fc as the initial received channel indicating a value to be substituted as an offset value in the intermediate frequency generator 153 (step S22). The mean frequency channel fc is a value which is set in advance in the previous detecting process or in the all-search process. In addition, the controller 156 sets numbers 0 to 3 as the identification number of the GPS satellites which corresponds to the C/A codes to be stored in the shift register 1513e first (step S23).

When the setting of parameters in steps S21 to S23 is completed, the controller 156 evokes the detecting operation process and carries out the detecting operation of signals transmitted from GPS satellites (step S24). In particular, as shown in FIG. 8, the controller 156 first operates the reverse-spread code generator 154 to input the C/A codes of the set satellite identification numbers in the shift register 1513e. Then, the controller 156 supplies operation clock to the entire capture engine 151, and respectively stores I-phase signals and Q-phase signals, which are calculated in the I/Q converter 1511 and the integration unit 1512, in the shift registers 1513a and 1513b in order. When data is stored in all of registers of the shift registers 1513a and 1513b, the controller 156 operates the selector 1513f to output the C/A codes of four satellites from the shift register 1513e in order before next data is to be input in the shift registers 1513a and 1513b. Then, the controller 156 obtains output values of the adder 1514c each of which are calculated based on each C/A code data and the input signal in order and stores the obtained output values in the memory 157 (step S41).

The controller 156 outputs the C/A codes of four satellites from the shift register 1513e by operating the selector 1513f every time when a piece of data is inputted to each of the shift registers 1513a and 1513b and phase thereof changes for one piece of data. Then, the controller 156 makes the capture engine 151 perform calculation based on the C/A codes and input signals of four satellites and stores data in the address of the phase in the memory 157 in order. When data of all phases with respect to the set four satellites and the receiving channel f is obtained, the controller 156 selects the maximum output value among the output values of all phases of the set receiving channel f for each of the set four GPS satellites (step S42). Thereafter, the controller 156 calculates the average value of the output values excluding the selected maximum output value for each GPS satellite (step S43), and calculates the ratio of the maximum output value to the calculated average value (noise level) as the S/N ratio value (step S44). When the S/N values are calculated, the controller 156 ends the detecting operation process and returns to the detecting process.

When the detecting operation process (step S24) is ended, next, the controller 156 determines whether each of the calculated S/N value is greater than the set threshold value a or not (step S25). When it is determined that all of the calculated S/N values are equal to the set threshold value a or smaller, the processing of the controller 156 proceeds to step S28. The controller 156 determines whether the set satellite identification numbers are 28 to 31 or not. When it is determined that the set satellite identification numbers are not 28 to 31, the controller 156 adds 4 to each of the four set satellite identification numbers (step S29). Then, the controller 156 repeats the processing of steps S24 and S25.

When it is determined that the set satellite identification numbers are 28 to 31 in the determining process of step S28, thereafter, the controller 156 determines whether the set receiving channel is the mean frequency channel fc−150 or not (step 330).

When it is determined that the set receiving channel is not the mean frequency channel fc−150 in the determining process of step S30, next, the controller 156 determines whether the set receiving channel is the mean frequency channel fc or smaller or not (step S31). When it is determined that the set receiving channel is the mean frequency channel fc or smaller, the controller 156 sets the next receiving channel to be the channel obtained by "2fc—present receiving channel+1" (step S32). Then, the controller 156 repeats the detecting operation process by returning to steps S23. On the other hand, when it is determined that the set receiving channel is greater than the mean frequency channel fc, the controller 156 sets the next receiving channel to be the channel obtained by "2fc—present received channel". Thereafter, the controller 156 repeats the processing of steps S23 to S25. That is, in the processing of steps S30 to S33, received channel is set so as to gradually be distanced from the mean frequency channel fc in order such as. "fc"→"fc+1"→"fc−1"→"fc+2"→"fc−2"→... ."fc+150"→"fc−150".

When it is determined that the set receiving channel is the mean frequency channel fc−150 in the determining process of step S30, the processing of the controller 156 proceeds to step S34.

When it is determined that any of the calculated S/N values is greater than the set threshold value a in the determining process of step S25, the controller 156 stores the receiving channel f and the calculated S/N value s in the position of address n in the memory 157 for each vale which is determined as being greater than the threshold value a (step S26). Further, the controller 156 adds 1 to the address n (step S27) Alternatively, the controller 156 may only store the receiving channel f in which the S/N value greater or equal to the threshold value a which is set earliest and the S/N value s thereof in the address n. Then, the processing of the controller 156 proceeds to step S34.

When the processing proceeds to step S34, the controller 156 calculates the mean frequency channel fc for the next time and ends the detecting process.

Figure 10:
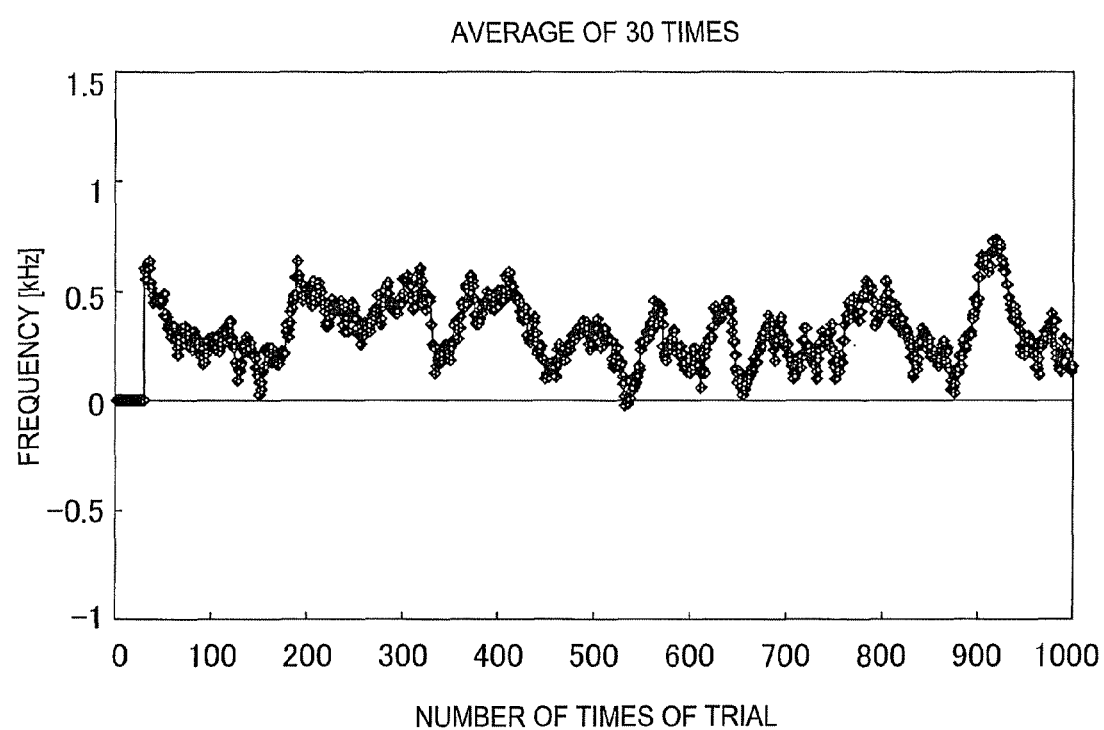
FIG. 10 is a diagram showing a specific example of deviations between the obtained mean frequency and the receiving frequencies where satellite signal was detected.

FIG. 10 is a diagram showing a result obtained by simulating transition of difference between the frequency corresponding to the mean frequency channel fc obtained by taking weighted average of S/N values s of the newest 30 receiving channels f stored in the memory 157 and the frequency corresponding to the receiving channel f in which a satellite signal is detected in the next detecting process, when the searching process shown in FIG. 9 is repeatedly carried out.

The difference between the frequency corresponding to the mean frequency channel fc obtained by the detecting process and the frequency corresponding to the receiving channel f in which a satellite signal is detected in the next detecting process is approximately within the range of 0.7 kHz. That is, it is indicated that radiowave from any one of the GPS satellites can be received by carrying out the changing process of receiving channel f for about 15 times at the most.

As described above, according to the satellite radiowave receiver 1 in the embodiment of the present invention, the satellite radiowave receiver 1 includes the capture engine 151 to search satellite signals from positioning satellites by switching the receiving frequency and the positioning satellite which is to be the receiving target in order and the controller 156 to calculate the mean frequency from receiving frequencies of the plurality of satellite signals detected by the capture engine 151, and detection of satellites signals starts from the mean frequency when searching satellite signals next time. Therefore, satellite signals can be detected quickly from an appropriate receiving frequency in which influences of both the doppler effect due to moving of the positioning satellites and the oscillation frequency offset in the satellite radiowave receiver 1 are taken into consideration.

Moreover, by quickly detecting satellite signals, time needed for receiving operation and detecting operation can be shortened. Therefore, the power consumption can be reduced.

Further, receiving frequencies of a plurality of satellite signals and receiving intensities (S/N values) are stored in the memory 157 by being corresponded to each other and the mean frequency is decided by taking the average value of the receiving frequencies to which weighting is carried out according to their receiving intensities. Therefore, satellite signals with good receiving condition can be detected quickly.

Furthermore, when satellite signals are to be searched by using the mean frequency, the receiving frequency is gradually changed so as to be distanced from the mean frequency. Therefore, the positioning satellite with good receiving condition can be easily detected preferentially.

Moreover, because satellite signals are searched by frequencies within the range set by setting the mean frequency as the center, vainness such as searching for satellite signals in the frequency band in which signal cannot be received due to the influence of oscillation frequency offset in the satellite radiowave receiver 1, for example, can be omitted. Further, even when the space above the point where the searching process is usually carried out is blocked by a shield such as a building and the searching process can only be carried out in a partial direction, the mean frequency is obtained by taking the doppler effect to the GPS satellite in the direction where signals are receivable and searching for satellite signals is carried out in frequencies within the range which is set by setting the mean frequency as the center. Therefore, frequency in which signals can be received efficiently can be searched even when the direction in which signals are actually receivable is set.

Moreover, the mean frequency is calculated based on the receiving frequencies and receiving intensities of the newest 30 satellite signals among the satellite signals detected by the satellite radiowave receiver 1. Therefore, satellite signals can be detected quickly without degrading the detection accuracy by gradually reflecting influences such as change in temperature according to seasons and change in orbits of the positioning satellites.

In addition, by adopting intensity ratio with respect to noise level as index of receiving intensity, the mean frequency can be calculate stably without allowing the deviation of weights of detected data of satellite signals of one time being extremely one sided.

The present invention is not limited to the above described embodiment and can be changed in many ways. For example, in the above embodiment, the all-search process is executed at the first activation of the satellite radiowave receiver 1. However, the timing of activation of the all-search process is not limited to the above timing and is not limited to one time. For example, the all-search process can be executed at the time of adjustment or inspection in the factory before the products are shipped out. Alternatively, the all-search process may be executed every time when positional information is obtained by using the GPS positioning function. Further, the all-search process can be set so as to be activated when the obtained positional information differs greatly from the positional information obtained previously or when the temperature changes greatly according to seasons and climates by moving between the south and north hemispheres or moving to a place of different latitude.

Moreover, the all-search process may be executed periodically, or alternatively, the accuracy of the receiving information to be stored in each address of the memory 157 can be improved by carrying out the all-search process in combination with the all-search process in which the range of received channels is narrowed or the searching process in which the threshold level of S/N ratio is elevated.

Further, in the above embodiment, the detected receiving frequency is stored in the memory 157 every time a satellite signal from a GPS satellite is detected. However, value of frequency offset of oscillation circuit is known to change depending on temperature. Therefore, for example, the satellite radiowave receiver 1 can be configured so remove the influence of a temporary temperature change when setting the mean frequency by placing a temperature sensor near the oscillation circuit and correcting the receiving frequency based on the measured data of the temperature sensor. Alternatively, the all-search process may be executed when the measured value of the temperature sensor changes greatly when obtaining time data by simply making the controller 156 monitor the measured value of the temperature sensor.

Moreover, in the above embodiment, the controller 156 and the memory 157 are disposed in the base bad unit 15 to be used. However, a micro-computer including a CPU which integrally controls the entire satellite radiowave receiver 1 and a RAM which temporarily stores data may be used. Further, the CPU which is used in the arithmetic processing unit 155 and the CPU of the controller 156 may be the same one.

Moreover, in the above embodiment, the process which is carried out when receiving L1-band radiowave in the GPS (Global Positioning System) is described. However, the present invention can be applied to the receiving process of other radiowave such as L2-band, and further, can be applied when using other positioning satellite systems such as GLONASS (Global Navigation Satellite System) or GALILEO. In addition, details such as the number of pieces of GPS satellite data to be searched paralelly and simultaneously, input/output frequency of each part, specific numerical values such as the number of bits of memory, particular configurations and arrangements, and the like shown in the above embodiment can be changed arbitrarily within the scope of the present invention.

What is claimed is:
1. A satellite radiowave receiver which obtains satellite signals transmitted from positioning satellites, comprising:
   a receiving unit which receives a radiowave in a frequency range which is set in advance, the frequency range including a frequency transmitted by the positioning satellites;
   a capture unit which captures the satellite signals from received signals based on the radiowave received by the receiving unit and which provides, for each captured satellite signal, a respective receiving frequency and an intensity index based on a signal intensity;
   a storage unit which stores the receiving frequencies of the satellite signals captured by the capture unit and intensity indexes indicating signal intensity of the satellite signals of the receiving frequencies so as to correspond with each other; and
   a calculation unit which calculates an average value, among the receiving frequencies, as a mean frequency by a weighted average method by the intensity indexes of the receiving frequencies according to the plurality of satellite signals stored in the storage unit,
   wherein
   the capture unit captures next satellite signals transmitted from the positioning satellites by using the mean frequency.
2. The satellite radiowave receiver according to claim 1, wherein the capture unit captures the next satellite signals by changing the receivable frequency range so that a deviation of a receiving frequency by which each of the satellite signals is to be captured from the mean frequency increases starting from zero.

3. The satellite radiowave receiver according to claim 1, wherein the capture unit captures the next satellite signals within the frequency range which is set in advance by using the mean frequency.

4. The satellite radiowave receiver according to claim 2, wherein the capture unit captures the next satellite signals within the frequency range which is set in advance by using the mean frequency.

5. The satellite radiowave receiver according to claim 1, wherein the storage unit stores a predetermined number of the receiving frequencies and the intensity indexes, and overwrites old data to store newest predetermined number of receiving frequencies and the intensity indexes among the satellite signals captured by the capture unit.

6. The satellite radiowave receiver according to claim 1, wherein the intensity index is a ratio between a signal intensity when the satellite signals of the receiving frequency in which the satellite signals are captured are captured and an average signal intensity when the satellite signals are not captured by the receiving frequency.

7. A satellite radiowave receiving method to obtain satellite signals from a radiowave received by a receiving unit by comprising the receiving unit which receives the radiowave transmitted from positioning satellites, comprising:

capturing the satellite signals from received signals based on the radiowave received by the receiving unit and providing, for each captured satellite signal, a respective receiving frequency and an intensity index based on a signal intensity;

storing the receiving frequencies of the satellite signals captured by the capturing and intensity indexes indicating signal intensity of the satellite signals of the receiving frequencies so as to correspond with each other; and calculating an average value, among the receiving frequencies, as a mean frequency by a weighted average method by the intensity indexes of the receiving frequencies according to the plurality of satellite signals stored by the storing, wherein next satellite signals are captured by using the mean frequency calculated by the calculating.

* * * * *